(12) United States Patent
Lapidot et al.

(10) Patent No.: US 10,669,390 B2
(45) Date of Patent: Jun. 2, 2020

(54) POROUS NANOCRYSTALLINE CELLULOSE STRUCTURES

(71) Applicants: Yissum Research Development Company of the Hebrew University of Jerusalem Ltd., Jerusalem (IL); Melodea ltd., Rehovot (IL)

(72) Inventors: Shaul Lapidot, Kibbutz Tzora (IL); Sigal Roth Shalev, Ramot Meir (IL); Rikard Slattegard, Nes Ziona (IL); Oded Shoseyov, Shoham (IL); Clarite Azerraf, Ashdod (IL); Ido Braslavsky, Ness Ziona (IL); Victor Yashunsky, Alon-shvut (IL)

(73) Assignees: Yissum Research Development Company of the Hebrew University of Jerusalem Ltd., Jerusalem (IL); Melodea Ltd., Rehovot (IL)

( * ) Notice: Subject to any disclaimer, the term of this patent is extended or adjusted under 35 U.S.C. 154(b) by 20 days.

(21) Appl. No.: 15/114,220

(22) PCT Filed: Jan. 29, 2015

(86) PCT No.: PCT/IL2015/050104
§ 371 (c)(1),
(2) Date: Jul. 26, 2016

(87) PCT Pub. No.: WO2015/114630
PCT Pub. Date: Aug. 6, 2015

(65) Prior Publication Data
US 2016/0369078 A1    Dec. 22, 2016

Related U.S. Application Data

(60) Provisional application No. 61/933,011, filed on Jan. 29, 2014, provisional application No. 61/933,013, filed on Jan. 29, 2014.

(51) Int. Cl.
| | | |
|---|---|---|
| *C08B 15/08* | (2006.01) | |
| *C08J 9/28* | (2006.01) | |
| *C08J 9/40* | (2006.01) | |
| *C08J 9/38* | (2006.01) | |

(52) U.S. Cl.
CPC ............... *C08J 9/28* (2013.01); *C08B 15/08* (2013.01); *C08J 9/38* (2013.01); *C08J 9/405* (2013.01); *C08J 2201/0484* (2013.01); *C08J 2205/04* (2013.01); *C08J 2301/00* (2013.01); *C08J 2301/02* (2013.01)

(58) Field of Classification Search
CPC .. C08B 3/22; C08B 3/24; C08B 15/08; C07H 1/06; C07H 1/08
USPC .......................................... 536/77, 127, 128
See application file for complete search history.

(56) References Cited

U.S. PATENT DOCUMENTS

| | | |
|---|---|---|
| 6,326,030 B1 | 12/2001 | Schoenfeldt et al. |
| 9,464,142 B2 * | 10/2016 | Shoseyov ............... C08B 15/08 |
| 2011/0033655 A1 | 2/2011 | Duchene |
| 2013/0131332 A1 | 5/2013 | Shoseyov et al. |
| 2013/0264732 A1 | 10/2013 | Youngblood et al. |
| 2014/0216672 A1 * | 8/2014 | Feng ....................... D21H 11/18 |
| | | 162/169 |
| 2014/0329992 A1 | 11/2014 | Van Boxtel |

FOREIGN PATENT DOCUMENTS

| | | |
|---|---|---|
| CN | 1860161 A | 11/2006 |
| CN | 102850576 A | 1/2013 |
| CN | 103304824 A | 9/2013 |
| JP | 2009-209217 A | 9/2009 |
| JP | 2012-511596 A | 5/2012 |
| JP | 2013-110987 A | 6/2013 |
| JP | 2015-003386 A | 1/2015 |
| WO | 2010/066036 A1 | 6/2010 |
| WO | 2012/032514 A1 | 3/2012 |

OTHER PUBLICATIONS

Ali et al., "The structure and mechanics of nanofibrillar cellulose foams", Soft Matter, vol. 9, pp. 1580-1588, (2013).
Dash et al., "Cellulose nanowhisker foams by freeze casting", Carbohydrate Polymers, vol. 88, No. 2, pp. 789-792, (2012).
De Souza Lima, et al., "Rodlike Cellulose Microcrystals: Structure, Properties, and Applications", Macromolecular Rapid Communications, vol. 25, No. 7, pp. 771-787, (2004).
Deville, "Ice templating, freeze casting: Beyond materials processing", Mater. Res., vol. 28, No. 17, pp. 2202-2219, (2013).
Eichhorn et al., "Review: current international research into cellulose nanofibres and nanocomposites", Journal of Materials Science, vol. 45, No. 1, pp. 1-33, (2010).
Lee et al., "The morphology and mechanical properties of layer structured cellulose microfibril foams from ice-templating methods", Soft Matter, vol. 7, pp. 6034-6040, (2011).
Samir et al., "Review of Recent Research into Cellulosic Whiskers, Their Properties and Their Application in Nanocomposite Field", Biomacromolecules, vol. 6, No. 2, pp. 612-626, (2005).
Svagan et al., "Biomimetic Foams of High Mechanical Performance Based on Nanostructured Cell Walls Reinforced by Native Cellulose Nanofibrils", Adv. Mater., vol. 20, pp. 1263-1269, (2008).
Svagan et al., "Towards tailored hierarchical structures in cellulose nanocomposite biofoams prepared by freezing/freeze-drying", J. Mater Chem., vol. 20, pp. 6646-6654, (2010).
Wang et al., "Approaching zero cellulose loss in cellulose nanocrystal (CNC) production: recovery and characterization of cellulosic solid residues (CSR) and CNC", Cellulose, 15 pages, Published online: Aug. 22, 2012.

\* cited by examiner

*Primary Examiner* — Jonathan S Lau
(74) *Attorney, Agent, or Firm* — Vorys, Sater, Seymour and Pease LLP

(57) ABSTRACT

Provided is a unique class of foam materials characterized by regions of material unidirectionality. The foam materials are configured for a great variety of end-use applications as core materials or as materials in construction of multilayered structures. The novel and ingenious process for making the composite materials of the invention, permits modifying the foam materials to suite any specific end use.

17 Claims, 7 Drawing Sheets

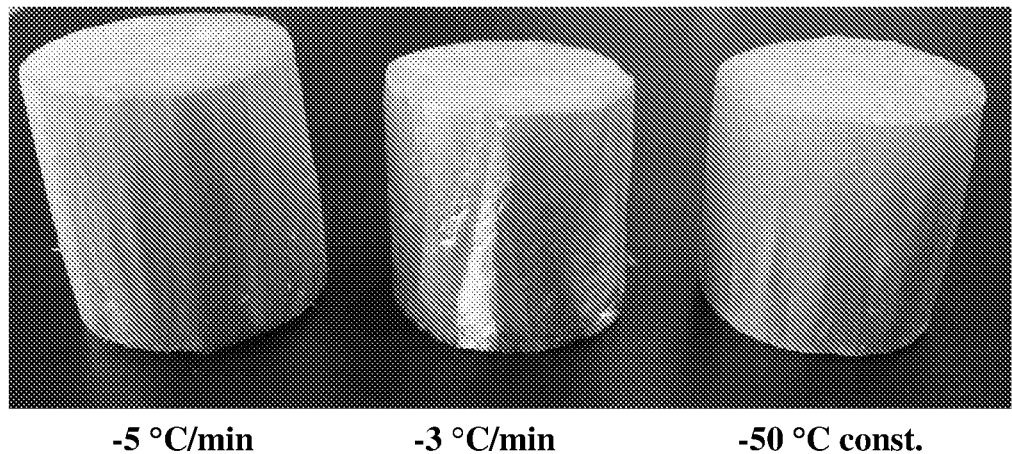
-5 °C/min     -3 °C/min     -50 °C const.
Fig. 4A
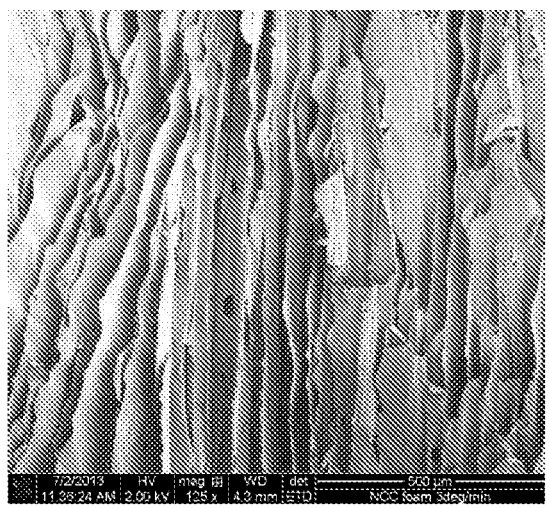 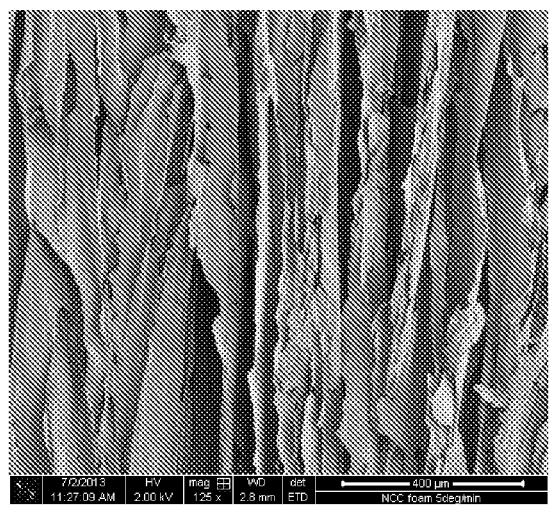
Fig. 4B           Fig. 4C

Fig. 7A
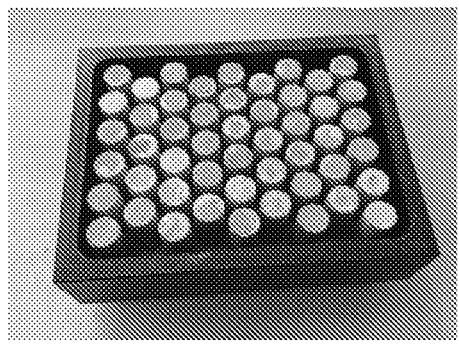
Fig. 7B
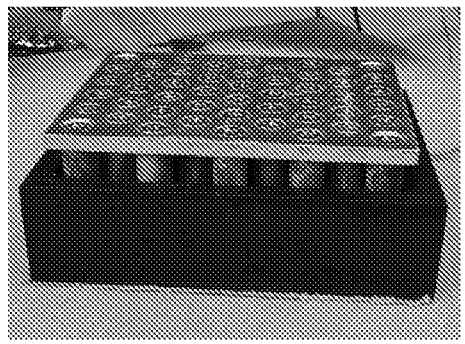
Fig. 7C
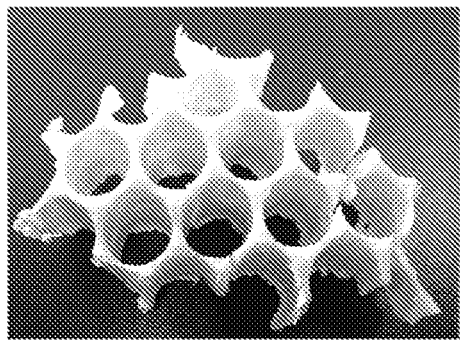
Fig. 7D
Figs. 7A-7D

POROUS NANOCRYSTALLINE CELLULOSE STRUCTURES

TECHNOLOGICAL FIELD

The present invention concerns structures constructed of nanocrystalline cellulose.

BACKGROUND

Polymeric foams are materials with high importance in the field of composite materials, and are used for many applications, e.g. for insulation, structural parts such as car dash boards, as well as for core materials in manufacturing of composite sandwich panels exhibiting high strength, improved energy dissipation, insulation, and light weight. Polymeric foams convey high insulation and weight reduction properties; however, some have low strength.

Sandwich structure composites can be described by thin and stiff facings that are attached to light weight thick core. The core material is normally limited strength material, but its higher thickness provides the sandwich composite with high bending stiffness with overall low density. Combination of the properties of the facings and the core results in structures which are extremely light and strong.

Materials used for core in sandwich structures can be divided into rigid foams or honeycomb structures. Expanded PVC and PET foams are examples for commonly used rigid foams. These foams are produced by chemical blowing (foaming) of the polymers and form sponge like rigid isotropic structures. Honeycomb structures such as aluminum, Kevlar, polypropylene, or cardboard form anisotropic structures with high compressive and shear strengths in the Z axis of the structure. Honeycomb structures, which are anisotropic by nature, are very useful as core for composites. Such cores resist the shear loads, increase the stiffness of the structure by holding the facing skins apart, and provide continuous support to flanges or facing skins, thereby producing uniformly stiffened structures.

Recently, it was shown that nanocrystalline cellulose (NCC) as well as nano-fibers can be processed into foams by various methods. NCC is a fibrous material produced from cellulose, typically being high-purity single crystals having an elongated shape. These constitute a generic class of materials having mechanical strengths equivalent to the binding forces of adjacent atoms. The resultant ordered structure is typically characterized by high mechanical strengths; the tensile strength properties of NCC are far above those of currently available high volume content reinforcements [1-3].

Irrespective of the processes employed for producing these foams, such as supercritical fluid extraction, microfluidics, etc., these foams display low resistance for compression and therefore their utilization as core materials is limited [3].

One available method for cellulose based foam formation is called "foam forming", according to which method cellulose pulp fibers are mixed with a detergent and the foam is thereafter produced following standard papermaking methods on a paper machine. The resulting product is a light weight flexible and soft foamed paper sheet with microporous structure and low degree of orientation.

Another available method for production of cellulose foams involves casting a NCC or a nano-fiber suspension into molds followed by freeze-drying [4-10]. Such foams self-assemble due to ice formation which pushes the NCC particles one towards each other. Consequently, controlling the ice growth results in controlled patterning of the foams This process, termed "ice-templating", was developed for controlling the assembly of a variety of materials and is typically used for assembly of colloidal suspensions into solids. To date, use of ice-templating was tested in laboratory-scale, and was found to yield foams of significantly inferior properties as compared to rigid synthetic foams.

Common freezing processes, as mentioned above, may result in the formation of light weight but very soft, easily disintegrated and low compressive strength structures, mainly due to the difficulty in controlling the rate of ice formation during the freezing process. Ice growing in supercooled environments results in dendrites that resemble snowflakes in their morphology and which negatively affect foam morphology and structure. Moreover, freezing in non-controlled systems, where the NCC slurry is exposed to low temperatures from different directions, presents little control on the direction of ice crystals formation and as a result cross sections of randomly crystallized foams may display local orientation in planes that face different directions parallel to the direction of the formed ice crystals; consequently leading to inferior mechanical properties.

Production of composite foams made from NCC reinforced with bio-resins as core materials for sandwich composites applications was also described [11]. Such composites usually have higher densities and therefore may be of less applicability as composite materials of low weight and high-strength are better suitable and more desired.

REFERENCES

[1] De Souza Lima, M. and R. Borsali, *Macromolecular Rapid Communications* 2004, 25(7), 771-787
[2] Samir, M., F. Alloin, and A. Dufresne, *Biomacromolecules* 2005, 6(2), 612-626
[3] Eichhorn, S., et al., *Journal of Materials Science* 2010, 45(1), 1-33
[4] Deville S., *J. Mater. Res.* 2013, 28(17), 2202-2219
[5] Svagan et al, *Adv. Mater.* 2008, 20, 1263-1269
[6] Svagan et al, *J. Mater. Chem.* 2010, 20, 6646-6654
[7] Ali et al., *Soft Matter* 2013, 9, 580-1588
[8] Dash et al, *Carbohydrate Polymers* 2012, 88(2), 789-792
[9] Köhnke et al, *Green Chem.* 2012, 14, 1864-1869
[10] Lee J. et al., *Soft Matter* 2011, 7, 6034-6040
[11] WO 2012/032514

GENERAL DESCRIPTION

The inventors of the invention disclosed herein have developed a unique class of foam materials which are characterized by regions of material unidirectionality. The foam materials are suitable for a great variety of end-use applications as core materials or as materials in construction of multilayered structures. The novel and ingenious process for making the composite materials of the invention, permits modifying the foam materials to suite any specific end use.

The unique structures of the foam materials of the invention endow the materials with any one or more of the following qualities:

light weight,
high compressive and shear strength,
thermal insulation,
acoustic insulation,
flame retardation,
hydrophobicity, and
structural and mechanical anisotropy, wherein each of these characteristics may be specifically and independently enhanced or modulated in order to suit the materials for any final use.

The foam materials are generally highly-oriented NCC-based structures having the indicated improved mechanical properties.

Thus, in one of its aspects, the invention provides a porous structure composed of at least partially interconnected sheets, the sheets being substantially unidirectionally oriented, the sheets comprising a cellulose-based material selected from nanocrystalline cellulose (NCC), microfibrillar cellulose (MFC) and mixtures thereof.

In another aspect, the invention provides a porous structure formed of at least partially interconnected sheets, the sheets defining a plurality of substantially elongated open pores, the pores being substantially unidirectionally oriented, the sheets comprising a cellulose-based material selected from nanocrystalline cellulose (NCC), microfibrillar cellulose (MFC) and mixtures thereof.

In a further aspect there is provided a porous structure formed of at least partially interconnected unidirectionally oriented sheets, the sheets defining a plurality of open pores being positioned within said sheets, wherein the sheets comprising a cellulose-based material selected from nanocrystalline cellulose (NCC), microfibrillar cellulose (MFC) and mixtures thereof.

The cellulose-based foam material of the invention comprises a plurality of cavities, each of said plurality of cavities having a wall surface comprising (or consisting) a cellulose material, with at least a region of the foam being unidirectionally oriented as defined. In some embodiments, the cavities within the foam having unidirectionality present a mixed structure wherein some of the cells have unidirectional orientation whereas other cavities present an isotropic structure, as detailed herein.

In some embodiments, the foam has an isotropic structure as detailed herein.

Nanocrystalline cellulose "NCC", also known as Cellulose Whiskers (CW) or crystalline nanocellulose (CNC), is used to define a material in the form of fibers produced from cellulose, typically being high-purity single crystals of cellulose. Microfibrillar cellulose, "MFC", also referred to at times as nano-fibrillated cellulose (NFC), is commonly produced with or without chemical or enzymatic treatment of mainly bleached pulp, followed by shearing and homogenization of the mainly bleached pulp, resulting in micrometer long fibers with a nano-metric diameter.

As known in the art, NCCs are elongated crystalline rod-like nanoparticles ("rice grains" structure) and MFCs are elongated strings ("spaghetti" like structure) consisting of alternating crystalline and amorphous segments. As used herein, MFC also encompasses nanofibrillated cellulose (NFC). The cellulose fibrils, being generally of higher crystallinity and purity than those obtained from plant sources, are inherently of nano-sized dimensions.

In some embodiments, the cellulose-based material is characterized by having at least 50% crystallinity. In further embodiments, the cellulose-based material is monocrystalline.

In some embodiments, the nanocrystals or fibrils of the cellulose-based material have a length of at least about 50 nm. In other embodiments, they are at least about 100 nm in length or are at most 1,000 μm in length. In other embodiments, the nanocrystals or fibrils are between about 100 nm and 1,000 μm in length, between about 100 nm and 900 μm in length, between about 100 nm and 600 μm in length, or between about 100 nm and 500 μm in length.

In some embodiments, the nanocrystals or fibrils of the cellulose-based material are between about 10 nm and 100 nm in length, between 100 nm and 1,000 nm in length, between about 100 nm and 900 nm in length, between about 100 nm and 800 nm in length, between about 100 nm and 600 nm in length, between about 100 nm and 500 nm in length, between about 100 nm and 400 nm in length, between about 100 nm and 300 nm in length, or between about 100 nm and 200 nm in length.

The nanocrystals or fibrils of the cellulose-based material may have an aspect ratio (length-to-diameter ratio) of 10 or more. In some embodiments, the aspect ratio is between 10 and 100, or between 20 and 100, or between 30 and 100, or between 40 and 100, or between 50 and 100, or between 60 and 100, or between 70 and 100, or between 80 and 100, or between 90 and 100, or between 61 and 100, or between 62 and 100, or between 63 and 100, or between 64 and 100, or between 65 and 100, or between 66 and 100, or between 67 and 100, or between 68 and 100, or between 69 and 100.

In some embodiments, the aspect ratio is between 67 and 100.

The NCC or MFC fibers constitute the sheets, which are at least partially interconnected, thereby forming the porous structures of the invention. The pores are therefore defined by the walls of the sheets and formed therebetween. In some embodiments, the pores are substantially elongated. In other embodiments, the pores are substantially rounded (bubble-like). In other embodiments, the pores are a mixture of elongated and round pores.

The term "partially interconnected" refers to the observation that the nano-cellulose sheets are connected to one another in one or more nodes or points or regions of their surfaces; they are not associated with one another along their entire respective surfaces. Namely, within the context of the present disclosure, the term means to encompass adjacent or neighboring sheets which have at least one node or point or region of connection between their surfaces, and at least one other portion which is not connected to an adjacent sheet(s). Without wishing to be bound by theory, the sheets are typically interconnected via hydrogen bonds (other bonding interactions may also be present depending on the specific nature and composition of the foam material). This allows the formation of a network of sheets defined by the connection nodes or points or regions between adjacent sheets, while the non-connected portions define the walls of the pores.

The sheets are arranged in the porous structure in a substantially unidirectional orientation, i.e. the majority of the sheets are arranged in the same direction and substantially parallel to one another, the direction being normal to the growth plane of the sheets (ice crystals). When relating to the pores, the term "substantially unidirectionally oriented", or any lingual variation thereof, is meant to refer to a porous structure in which the majority of the elongated or other present pores are arranged such that their longitudinal axes are directed substantially in the same direction.

In some embodiments, the foam material is characterized by a structure having sheets arranged unidirectionally. In other embodiments, some regions of the foam material are fully directional, with others being anisotropic.

As the cellulose-based material is of a fibrous nature, in some embodiments, the sheets may be composed of aligned cellulose nanocrystals or aligned cellulose fibrils. The term "aligned", or any lingual variation thereof, denotes an arrangement in which at least a portion, in some embodiments, the majority of the nanocrystals or fibrils are positioned substantially in parallel to one another, forming the ordered sheet(s).

In some embodiments, the sheets have a thickness of between about 5 and 50 nm. In some embodiments, the sheets have a thickness of between about 10 and 50 nm. In some embodiments, the sheets have a thickness of between about 15 and 50 nm. In some embodiments, the sheets have a thickness of between about 20 and 50 nm. In some embodiments, the sheets have a thickness of between about 25 and 50 nm. In some embodiments, the sheets have a thickness of between about 30 and 50 nm. In some embodiments, the sheets have a thickness of between about 35 and 50 nm. In some embodiments, the sheets have a thickness of between about 40 and 50 nm. In some embodiments, the sheets have a thickness of between about 45 and 50 nm. In some embodiments, the sheets have a thickness of between about 5 and 40 nm. In some embodiments, the sheets have a thickness of between about 5 and 30 nm. In some embodiments, the sheets have a thickness of between about 5 and 20 nm. In some embodiments, the sheets have a thickness of between about 5 and 10 nm. In some embodiments, the sheets have a thickness of between about 10 and 20 nm. In some embodiments, the sheets have a thickness of between about 10 and 30 nm. In some embodiments, the sheets have a thickness of between about 10 and 40 nm.

In other embodiments, the sheets define planar or curved surfaces. In other embodiments, each sheet may be planar, curved, or may have some planar regions while other regions are curved.

The porous structures of the invention are characterized by improved mechanical properties, as detailed above. Such properties, as those recited above, may be modulated and tailor-tuned to suit a particular final use. In some embodiments, the porous structures have compression strengths of at least about 0.1 MPa. In some embodiments, the compression strength is at most 15 MPa. In some embodiments, the compression strength is between 0.1 MPa to 15 MPa.

In other embodiments, the porous structures have a density of between about 10 kg/m$^3$ and 250 kg/m$^3$, thereby enabling maintaining various weights (or low self-weights) without hampering the mechanical properties of the structures or articles made thereof.

In some embodiments, the structures of the invention are comprised of NCC.

When detergents are used in a process for making porous structures of the invention, the structures exhibit a plurality of open-cell spherical structures (spherical cavities or pores of any shape, structure and size) that are connected to one another, forming an interconnected network.

The structures of the invention may be used as composite materials. The structures of the invention may serve as scaffolds onto which and/or into which at least one additional component may be introduced in order to impart thereto additional features. In some embodiments, the structure of the invention may be infused with a polymer resin selected amongst natural or synthetic thermoset polymer resins and thermoplastic polymer resins.

Thus, the invention further provides a structure according to the invention which further comprises at least one polymer or a reinforcing material. The polymer material may be selected amongst thermoset polymers and/or thermoplastic polymers, that undergo curing by heating, a chemical reaction, and/or irradiation.

In some embodiments, the polymer is at least one thermoset polymer resin, being synthetic, semi-synthetic or bio-based obtained from a natural source (either as a modified or non-modified resin material). Non-limiting examples of such thermoset resins include: thermoset silicone polymers such as cured silicone elastomers, silicone gels, and silicone resins; and thermoset organic polymers such as furan resins, epoxy resin amino resins, polyurethanes (polyols and isothiocyanates), polyimides, phenolic resins, cyanate ester resins, bismaleimide resins, polyesters, acrylic resins, and others.

In some embodiments, the at least one polymer is biobased. Non-limiting examples of such biobased resins include: UV curable epoxidised soybean oil acrylate (UCB, Ebecryl 860), linseed triglycerides and polycarboxylic acid anhydrides (Biocomposites and more, PTP), triglyceride acrylate (Cogins, Tribest S531), epoxidised pine oil waste (Amroy, EPOBIOX™), DSM Palapreg$^R$ ECO P55-01, Ashland Envirez$^R$ Unsaturated Polyester Resins from renewable and recycled Resources, Soy oil unsaturated polyester (Reichhold, POLYLITE 31325-00), Liquid epoxy resins based on glycerin (Huntsman) and others.

In other embodiments, the polymer is at least one thermoplastic resin. Non-limiting examples of such thermoplastic resins include: polyolefins, polar thermoplastics, polystyrene, polyvinyl chloride (PVC), acrylonitrile-butadiene-styrene (ABS), styrene copolymers, polyacrylonitrile, polyacrylates, polyacrylamides, vinyl acetate polymers, vinyl alcohol polymers, cellulose plastics, thermoplastic elastomers, thermoplastic polyurethanes, polyester-based thermoplastic elastomers, thermoplastic polyesters, polyethylene terephthalate, polybutylene terephthalate, compatibilized thermoplastic blends, polyacetal, polyethers, polyarylates, polycarbonates, polyamides, polyimides, polybenzimidazoles, aromatic polyhydrazides and polyoxadiazoles, polyphenyl-quinoxalines, polyphenylene sulfide, polyphenylenevinylene, conducting thermoplastics, conducting thermoplastics composites, poly(arylethersulfone)s, poly(aryletherketone)s, poly(aryletherketones-co-sulfones), poly(aryletherketone amide)s, polytetrafluoroethylene and mixtures thereof.

In other embodiments, the at least one resin is selected from a standard polyester, an epoxy and natural rubber.

In order to endow structures of the invention with increased mechanical stability, depending on the final intended application, the porous structure according to the invention may, in some embodiments, be associated with at least one layer of a lamination material, such that the sheets of the structure are oriented normal to said layer. This forms a laminated article. Such an arrangement endows the article with improved resistance to compression loads exerted in the direction of the sheets' orientation within the article.

Thus, the invention also provides articles comprising one or more layers of a foam material according to the invention, wherein each of the one or more layers may be separated from the other by a lamination sheet or a polymeric film. In some embodiments, the article comprises one or more layers of a foam material according to the invention, wherein the layers are stacked on top of each other without any intermediate or separating films or sheets.

For example, where the article is substantially flat, it may be laminated on one or both of its faces with one or more lamination layers. Where the article is constructed as a three dimensional cube, it may be laminated on all of its faces. The lamination film may be of any appropriate material for the intended use. In some embodiments, on top of a lamination sheet, another structure of a foam material of the invention may be positioned.

In some embodiments, the lamination material is selected from a natural material and a synthetic material. Exemplary, non-limiting natural materials may be selected from natural fabrics, including flax, sisal, wood-fibers hemp, cotton, and others. Synthetic lamination materials may be selected from mineral wool fiber, glass wool, glass fibers, synthetic fibers such as aramid, paper materials, plastic materials, carbon fibers, metallic sheets, polymeric sheets, polymeric films, etc.

Generally, articles of the invention may be constructed by bonding at least one sheet of a lamination material onto an outer surface (face) of a porous structure (a foam material). Typically, when forming a planar article, the porous structure is sandwiched between two layers of lamination materials, each of which may be made of similar or different materials. The lamination may be achievable by applying pressure and/or heat. Thus, for example, an article of the invention may be laminated on one of its faces with a paper material and on another of its faces with a natural fabric such as flax.

The articles of the invention may be manipulated to any desired shape and size.

In some embodiments, the structure or article of the invention has a honeycomb structure. The honeycomb structure is composed of a plurality of substantially elongated open pores, the pores being substantially unidirectionally oriented, the cellulose-based material being selected from nanocrystalline cellulose (NCC), microfibrillar cellulose (MFC) and mixtures thereof.

In some embodiments, the honeycomb structure is composed of a plurality of open pores, the pores being surrounded by walls of a cellulose-based material selected from nanocrystalline cellulose (NCC), microfibrillar cellulose (MFC) and mixtures thereof.

In some embodiments, any of the articles, foams, composites or other products according to the invention comprise or consist of NCC fibers having average length of 250±100 nm. Such fibers, as further discussed below, are unique as their length is far larger (longer) than NCC fibers previously prepared and reported.

In another aspect, the invention further provides a structure or an article or a composite or a product, as defined herein, comprising NCC fibers having average length of 250±100 nm.

In another aspect, the invention provides articles, structures or products comprising the porous structure of the invention as herein described.

In another one of its aspects, the invention provides a process for producing a porous structure composed of partially interconnected cellulose-based sheets, the sheets being substantially unidirectionally oriented, the process comprising:

(a) unidirectionally freezing an aqueous slurry of cellulose-based material in in a vessel having an end, e.g., a base, that permits efficient heat transfer to execute directional cooling, thereby obtaining a water-wet porous structure;

(b) treating said water-wet porous structure with a first solvent, thereby obtaining a solvent-wet porous structure comprised of substantially unidirectionally oriented, cellulose-based interconnected sheets; and (c) optionally evaporating the solvent, to obtain a dry porous structure comprised of substantially unidirectionally oriented, cellulose-based interconnected sheets.

In some embodiments, the process comprises:

(a) providing a slurry of cellulose-based material in an aqueous medium;

(b) unidirectionally freezing said slurry in a vessel having an end, e.g., a base, that permits directional cooling, thereby obtaining a water-wet porous structure;

(c) treating said water-wet porous structure with a first solvent, to obtain a solvent-wet porous structure; and (d) evaporating the solvent, to obtain the porous structure comprised of substantially unidirectionally oriented, cellulose-based interconnected sheets.

In some embodiments, the cellulose-based material is selected from nanocrystalline cellulose (NCC), microfibrillar cellulose (MFC) and mixtures thereof.

In some embodiments, the vessel or the aqueous medium are treated with ice nucleation seeds, as may be necessary. Alternatively, ice nucleation may be induced by physical methods, such as acoustic waves, electric pulse or introduction of an ice containing substrate.

Without wishing to be bound by theory, the porous structures of the invention are produced by directionally controlling ice crystallization in pore domains within the cellulose-based material and subsequently removing the ice/water using a solvent exchange process. Cryo-concentration ice-templating/freeze-casting methods use solidification of a solvent (e.g., water) to produce porous structures. Growing crystals reject and squeeze the suspended particles in between. In such a way particles take the form of inverted replica of the crystals. Confined cellulose nano particles self-assemble and are held together by hydrogen and Van der Waals bonds. The final microstructure of the material may be determined by several factors, inter alia, raw suspension state (e.g., liquid, emulsion, foam), particle concentration, geometry of cooling (temperature gradient), rate of cooling, ice shaping additives and others.

The slurry (or suspension) used in the process of the invention comprises the cellulose-based material and an aqueous medium (i.e., water or a water-based solution). In some embodiments, the slurry further comprises at least one additive selected from at least one detergent, at least one surfactant and at least one stabilizer. In some embodiments, the slurry comprises any combination of the above additives.

In some embodiments, the concentration of said cellulose-based material in said slurry is below about 50% (w/v). In some embodiments, the concentration is below about 25%.

In some embodiments, the concentration is at least about 10% (w/v). In further embodiments, the concentration is at most about 10%. In yet further embodiments, the concentration is between about 1 and 5% (w/v).

In further embodiments, the concentration is below about 10%. In still additional embodiments, the concentration is below about 5%.

In some embodiments, the concentration of said cellulose-based material in said slurry is between about 1% and 50% (w/v), or between about 1% and 40% (w/v), or between about 1% and 30% (w/v), or between about 1% and 20% (w/v), or between about 1% and 10% (w/v), or between about 10% and 50% (w/v), or between about 20% and 50% (w/v), or between about 30% and 50% (w/v), or between about 40% and 50% (w/v).

The slurry is cast into a vessel permitting directional cooling, i.e. cooling of the slurry from only one direction of the vessel's walls, or any directional cooling, such as radial cooling, typically but not limited to cooling the vessel's base or top. This allows for directional freezing of the aqueous medium in the slurry, gradually orienting the cellulose-based material to result in a water-wet porous structure.

The vessel may be of any desired shape, provided that the cooling unit e.g., the base or top is made of a material having high thermal conductivity, such as copper, copper alloy, aluminum foil, carbon fibers, or any other material known to have high thermal conductivity. The vessel's other walls may be made of a material of a low thermal conductivity, typically of a polymeric or heat-insulating material, or having a structure that reduces its thermal conductivity (such as insulating double-wall structure).

In some embodiments, the directional cooling is carried out at a constant cooling rate or by maintaining an end of the vessel, e.g., the base, at a constant temperature. In such embodiments, the base is cooled at a constant cooling rate of between about −1° C./min (reduction of 1° C. per minute) and −40° C./min (reduction of 40° C. per minute). In other embodiments, said rate is between about −1° C./min and about −10° C./min. In other embodiments, said rate is between about −1° C./min and about −5° C./min.

In other embodiments, the vessel end, e.g., the base, is maintained at a constant temperature, which may be between about −40 and −80° C. In some other embodiments, the temperature of the base is maintained at between about −50 and −80° C., between about −60 and −80° C., between about −50 and −70° C., or between about −50 and −60° C.

In some embodiments, the vessel end, e.g., the base, is maintained at a constant temperature, being between about −80° C. and zero degrees. In some other embodiments, the temperature is maintained at between about −50 and 0° C., between about −60 and 0° C., between about −50 and 0° C., between about −40 and 0° C., between about −30 and 0° C., between about −20 and 0° C., between about −10 and 0° C., or at 0° C.

In some embodiments, the vessel end, e.g., the base, is maintained at a constant temperature, being between about −10 and 0° C., or between about −5 and 0° C., or between about −5 and +4° C.

In order to allow for better control of the formation and progression of the ice-front through the slurry during freezing, the inner surface of the vessel's end, e.g., bottom of the vessel, base, may be pre-coated with nucleation seeds or a composition comprising same. This enables a reduction of super-cooling and an elevation of the typical nucleation temperature of the aqueous medium to only few degrees below 0° C., thereby avoiding higher super-cooling of the medium, as under super-cooling conditions little control of the ice-front formation and progression may be obtained.

The nucleation seeds may be selected amongst such materials known in the art. Generally, the seeds may be selected amongst organic, inorganic materials and materials obtained from biological sources.

The selection of nucleation seeds or nucleating agents which may be used in accordance with the present invention are recited or disclosed in any one or more of the following:
1. Edwards, G. R., L. F. Evans, 1968: Ice Nucleation by Silver Iodide: III. The Nature of the Nucleating Site. *J. Atmos. Sci.*, 25, 249-256.
2. Vali G. Quantitative evaluation of experimental results on the heterogeneous freezing nucleation of supercooled liquids. J. Atoms Sci. 1971; 28 402-409
3. Ice Nucleation Induced by Pseudomonas syringael, Environ. Microbiol. 1974, vol. 28 no. 3456-459.
4. Identification and purification of a bacterial ice-nucleation protein, PNAS 1986, vol. 83 no. 19, 7256-7260.
5. The Nucleation of Ice Formation by Silver Iodide, B. Vonnegut J. Appl. Phys. 18, 593 (1947).
6. Nucleation Catalysis, David Turnbull and Bernard Vonnegut, Industrial and Engineering Chemistry Vol. 44, No. 6.
7. Inactivation of Ice Nucleating Activity of Silver Iodide by Antifreeze Proteins and Synthetic Polymers, J. Phys. Chem. B, 2012, 116 (18), pp 5364-5371.
8. Nucleation of ice and its management in ecosystems, Philosophical Transactions of The Royal Society of London, Series A-Mathematical Physical and Engineering Sciences, Vol 361, Issue 1804 Pages: 557-574, 2003.
9. Improving Ice Nucleation Activity of Zein Film through Layer-by-Layer Deposition of Extracellular Ice Nucleators, Shi, K; Yu, H L; Lee, T C; Huang, Q R, ACS Applied Materials & Interfaces, Vol 5, Issue 21, 10456-10464, 2013.
10. Li, J., and Lee, Tung-Ching (1995) "Bacterial Ice Nucleation and its Application in the Food Industry" Trends in Food Science and Technology 6: 259-265.

In some embodiments, the nucleation seeds are selected amongst inorganic materials. Such materials may be any one or more of silver iodide, silver bromide, bismuth triiodide, and mixtures thereof.

In some embodiments, the nucleation seeds are selected amongst bacterial ice nucleation factors such as *Pseudomonas syringae, Erwinia herbicola* and *Xanthomonas*.

In other embodiments, the nucleation seeds are selected amongst bacterial proteins, insect proteins and synthetic nucleating agents, as known in the art.

Alternatively, ice nucleation can be induced by physical methods, such as acoustic waves, electric pulse or introduction of an ice containing substrate.

Next, the water-wet structure is treated with a first solvent for removing substantially all of the water contained within the pores, thereby obtaining a solvent-wet porous structure. This may be achieved by treating the water-wet structure with a first, typically water-soluble solvent, under conditions permitting exchange of water contained within the structure with the first solvent. This may be carried out, for example, by soaking the water-wet structure in a bath containing the first solvent.

In some embodiments, the first solvent is selected from water soluble solvents such as methanol, ethanol, propanol, iso-propanol, acetone, acetonitrile, tert-butanol, DMF, DMSO, dioxane, THF, ethylene glycol and glycerol.

After water replacement has been completed, the solvent-wet structure may be dried from the solvent by, e.g., evaporation of the solvent; such drying may take place at room temperature or may require reduced pressure.

Following evaporation, a solvent and water-free porous structure is obtained, which may be further used as described herein.

In some embodiments, the solvent-wet structure (e.g., obtained at step (c) above), may be further treated (i.e. step (c')) prior to evaporation with a second, less water-miscible, solvent having low surface tension such as hexane or t-butanol. In some embodiments, the second solvent may be selected from methanol, ethanol, propanol, iso-propanol, acetone, hexane, t-butanol, or mixtures thereof.

In some embodiments, the first and the second solvents are the same. In other embodiments, the first and the second solvents are different from one another.

The process may comprise further steps, said steps comprising:
immersing the porous structure in a monomer or pre-polymer mixture, and
affecting cross-linking of said monomer or pre-polymer mixture.

In some embodiments, the pre-polymer or monomer mixture is selected from maleic anhydride, maleic acid, fumaric acid, succinic acid, succinic anhydride, 2,5-furan dicarboxylic acid (FDCA), adipic acid, glycerol, ethylene glycol, neopentyl glycol, trimethylolpropane, pentaerythritol and vegetable oils, e.g., castor oil.

In other embodiments, the pre-polymer mixture comprises a solvent selected from methanol, ethanol, propanol, iso-propanol, acetone, acetonitrile, tert-butanol, DMF, DMSO, dioxane, THF, ethylene glycol or glycerol.

According to other embodiments, the cross-linking is carried out at a temperature of between about 80° C. and 200° C.

The rate of cross-linking can be increased by the addition of catalysts such as organic or inorganic acids, e.g., tartaric acid, citric acid, p-toluenesulfonic acid (PTSA or pTsOH) or sulfuric acid. The crosslinking can also be enhanced by the addition of radical initiators such as azo-bis-isobutyronitrile (AIBN) or peroxides, e.g., as benzoyl peroxide.

The cellulose-based foams/structures of the invention may be similarly formed by mixing of the cellulose-based material, e.g., NCC suspensions with a detergent/surfactant. The dried NCC foam formed has, in at least one region thereof, the characteristic open-cell unidirectionality described herein, and in some embodiments, may exhibit isotropic characteristics.

Thus, in some embodiments, the slurry of a cellulose-based material in an aqueous medium may be formed by mixing therein at least one detergent or at least one surfactant. In such embodiments, the slurry may be mixed to induce formation of detergent/surfactant bubbles, i.e., spheres containing air, within the slurry.

When detergents are used in a method of the invention, the plurality of cells form open cell spherical structures, still maintaining the characteristic unidirectionality, with the additional open-cellular structures containing pores (spherical cavities or pores of any shape, structure and size) that may be connected to one another, forming an interconnected network.

Alternatively to using a detergent or a surfactant, the plurality of pores or cavities within the structure of the foam, as defined to have unidirectionallity, may be formed by employing at least one material capable of forming gas-filled regions or liquid-filled regions or otherwise solid particulates in a medium comprising the NCC, whereby removal of said gas, liquid or solid material from said gas-filled regions or liquid-filled regions or otherwise solid particulates, respectively, under conditions specified herein, permits formation of the plurality of cavities such that the porous foam of the invention has physical properties which are equal or substantially equal, or uniform or substantially uniform in all directions (being isotropic).

In some embodiments, the cavities within the foam material are achievable by mixing at least one detergent/surfactant material and NCC to form a plurality of detergent spheres containing gas, e.g., air, wherein the NCC coating walls of the detergent spheres (bubbles). In such embodiments, the NCC is allowed to self-assemble around the walls of said spheres, subsequently thereto the at least one detergent is removed, leaving a plurality of cavities having each a wall surface comprising NCC.

In some embodiments, the cavities may be formed by mixing into the slurry medium a gas or a gas-forming material for affecting the size and distribution of bubbles during the manufacture process.

In some embodiments, the slurry medium containing the NCC and the material affecting bubbles in said medium, may further comprise at least one stabilizing agent for modulating the stability of the bubbles.

In other embodiments, the material is achieved by mixing at least one oil to the aqueous medium containing NCC, to form a plurality of oil droplets in said medium, wherein the NCC coats walls of the oil droplets. In such embodiments, the NCC is allowed to self-assemble around the walls of said droplets, subsequently thereto the at least one oil is removed, leaving a plurality of cavities having each a wall surface comprising NCC.

In some embodiments, where the cavities are formed by the inclusion of at least one detergent or surfactant, the at least one detergent employed in accordance with the invention may be selected from all-purpose water-based or organic-based foaming agents. In some embodiments, the at least one detergent is water soluble or water insoluble. In some embodiments, said at least one detergent being selected from washing agents, heavy-duty washing agents and/or cleaning detergents, which may be in a liquid, gel or paste-like form. In some embodiments, the at least one detergent may be selected from liquid fine-fabric detergents, dishwashing agents, heavy duty or light duty dishwashing agents, machine dishwashing agents, liquid cleaning agents such as antibacterial hand-wash types, cleaning bars, mouth washes, denture cleaners, car or carpet shampoos, bathroom cleaners, hair shampoos, shower gels, foam baths and others.

In some embodiments, a surfactant material may be used. Such surfactant materials may be generally selected from amongst anionic surfactants (such as sulfate esters (SDS), carboxylates or phosphate esters, SDS); cationic surfactants (such as CTAB); nonionic surfactants; and any other known surfactant or any combination of two or more such surfactant.

In other embodiments, the foam material may be achieved by mixing an aqueous medium containing NCC, under conditions of reduced temperature, as defined in a process of the invention disclosed herein, in the presence or absence of one or more additional agent, e.g., detergent material, surfactant, plasticizers such as glycerol or oil, and nucleating agents to permit icing of the medium and slow formation of a structure containing voids in form of non-spherical voids, tortuous channels, or voids or cavities of substantially any size, shape or structure, wherein the voids or cavities are formed by the gas phase mixed into the medium, e.g., the gas phase being air, or any other gas. The structure may be bitten or crushed or more vigorously mixed to afford ice-filled cavities of a variety of sizes, shapes and structures. In order to modulate or control the size of the ice cavities, the medium may be treated with agents which enhance or depress ice growth.

In some embodiments, the icing is achievable in an ice-cream freezer or ice-cream production unit (large or small scale).

In another aspect, the invention provides a foam material comprising a plurality of cavities, each of said plurality of cavities having a wall surface comprising nanocrystalline cellulose (NCC), and wherein the NCC are randomly oriented in said foam material.

The partially solidified or high viscosity slurry according to the invention or produced according to processes of the invention may be molded into a desired structure or shape prior to final freezing and solvent-exchange.

Thus, the invention further provides a process for preparing a foam/structure of the invention, the process comprising:

mixing at least one cellulose-based material, e.g., NCC, with at least one material in an aqueous medium, as disclosed herein;

molding the mixture thus formed under conditions permitting a semi-solid composite, as disclosed herein;

affecting solvent exchange with at least one organic solvent, as disclosed herein;

drying said composite from said organic solvent to obtain a foam of the invention; and optionally treating said dry foam with a polymer material or a pre-polymer and curing said polymer or pre-polymer.

In some embodiments, said at least one material being selected from at least one detergent/surfactant, at least one gaseous material, at least one material capable of generating gas, at least one oil, or any one agent capable of forming an emulsion.

In some embodiments, the at least one material is a detergent/surfactant.

In some embodiments, the mixing of NCC and said detergent is achieved under high shear conditions. In some embodiments, the high shear mixing affords a cream-like suspension comprising a plurality of detergent bubbles, each being coated with a film, coat or layer of NCC.

The invention further provides a process for preparing a foam of the invention, the process comprising:

mixing NCC in an aqueous medium under conditions of reduced temperature to affect icing of said aqueous medium, as disclosed herein;

molding the iced medium under conditions permitting a composite;

affecting solvent exchange with at least one organic solvent;

drying said composite from said organic solvent to obtain a foam; and optionally treating said dry foam with a polymer material or a pre-polymer and curing said polymer or pre-polymer.

As disclosed herein, molding may be performed under freeze-molding in a mold of a predetermined shape. The mold into which the NCC suspension is cast may be shaped to any desired architecture. This enables the production of structural parts and core materials of predetermined shapes. Different mold shapes and textures are possible, in accordance with the present invention, enabling the production of parts with various skin textures, such as smooth skin and skin with nano patterning for self cleaning materials. Some non-limiting examples of mold materials are aluminum, silicon, polystyrene and carbon fiber/epoxy composite molds.

In some embodiments, the foam mixture is poured into a mold and frozen at any cryo-temperature. In some embodiments, the temperature at which freezing occurs is below $0°$ C. In other embodiments, the temperature is between about $-50°$ C. and about $-90°$ C. In further embodiments, the temperature is between about $-60°$ C. and about $-80°$ C. and in further embodiments the freezing temperature is between about $-70°$ C. and about $-80°$ C. In some embodiments, the temperature is between about $-80°$ C. and zero degrees. In some other embodiments, the temperature is between about $-50°$ C. and $0°$ C., $-60°$ C. and $0°$ C., $-50°$ C. and $0°$ C., $-40°$ C. and $0°$ C., $-30°$ C. and $0°$ C., $-20°$ C. and $0°$ C., $-10°$ C. and $0°$ C., or is $0°$ C.

In some embodiments, the temperature is between about $-10°$ C. and $0°$ C., or $-5°$ C. and $0°$ C., or $-5°$ C. and $+4°$ C.

In some embodiments, solvent exchange is achieved by first treating the foam with a water-soluble solvent, e.g., ethanol, methanol, acetone, iso-propanol, etc., or with an aqueous salt solution (NaCl, NaBr, KCl, KBr, and others), under conditions permitting exchange of water contained within the foam cavities with the water-soluble solvent or with the salt. This may be achievable, for example by soaking the foam material in a bath containing the water-soluble solvent or the salt-solution. In order to minimize structural damage to the foam, the solvent is typically cooled to a temperature below $0°$ C.

In some embodiments, ethanol is added and the foam is allowed to thaw.

In yet another aspect, the invention provides the use of a porous structure as herein described in the preparation of a composite article.

In some embodiments, said composite article is selected from a panel, a flexible sheet, a tile, a wing-part, a structural element, a wall panel, a floor panel, wall elements in boats and ships and others.

In some embodiments, the composite is selected from a substantially 2-dimentional structure. In other embodiments, the article is a 3-dimentional structure.

The invention also provides a honeycomb structure of a material selected from nanocrystalline cellulose (NCC), microfibrillar cellulose (MFC) or mixtures thereof, the structure comprising a plurality of cell channels formed by channel walls. In some embodiments, the honeycomb structure is formed by a process according to the invention.

In a honeycomb article of the invention each of the channel walls being substantially unidirectionally oriented; namely the honeycomb comprises a plurality of substantially elongated open pores, the pores being substantially unidirectionally oriented, with the channel walls comprising a cellulose-based material selected from nanocrystalline cellulose (NCC), microfibrillar cellulose (MFC) and mixtures thereof.

The honeycomb may be prepared by any one process known in the art, including expansion, corrugation and molding, each as known to the artisan.

In some embodiments, the honeycomb is prepared according to a method of the invention. As may be understood, the methods disclosed herein allow production of bulk foams and also of foams with complex internal architecture such as a honeycomb structure. In non-limiting embodiments, the honeycomb foam is formed by dipping into the NCC slurry, prior to freezing, a mold having a plurality of elongated pins, typically each pin having any cross-sectional shape, e.g., rounded or hexagonal shape, to provide a NCC structure having honeycomb shape (the mold, rendering the foam with a honeycomb shape). Due to the directional freezing the compression strength of the foam is increased compared to non-directional foams.

The NCC employed in a process or product according to the invention, may be any NCC known in the art, or NCC as defined herein. In certain cases, there arises the need to provide an exquisite NCC material preparable by a fine-tuned process comprising treating a cellulose containing material with an aqueous solution comprising between 59 and 63% acid. The process may be carried out on a variety of cellulose-containing materials, of any purity and consistency, such as paper mill waste, including waste in the form of cellulose sludge from paper production plants.

As will be demonstrated hereinbelow, the NCC produced by this process utilizing an acid concentration specifically selected to be between 59 and 63% is highly unique and better suitable for a great variety of uses, as compared to NCC prepared by processes known in the art.

Thus, the invention provides in another of its aspects a process for producing NCC, the process comprises:

a) treating a cellulose-containing material with a formulation comprising between 59 and 63% acid, said treatment does not alter the cellulose morphology;

b) causing preferential degradation of cellulose amorphous domains while maintaining intact the cellulose crystalline domains; and c) isolating the crystalline domains.

In some embodiments, the process further comprises the step of treating the cellulose-containing material to separate therefrom cellulose in pure or substantially pure form.

In further embodiments, the process comprising dispersing the product obtained in step c) to obtain NCC.

In some embodiments, the acidification is achievable by an acid selected from $H_2SO_4$, HCl, HBr and $HNO_3$. In some embodiments, the acid is $H_2SO_4$.

cultural or industrial by-products, e.g., municipal sludge (made up of, e.g., toilet paper scraps, vegetable fibers, etc), municipal sewage (such as dairy farms sludge and everything from wheat straw to sunflower stalks, and other agricultural cellulosic waste, scraps from the garment industry, or rags and cellulose discards recycled from other sources.

In comparison to processes thus far known for the production of NCC from cellulose of a variety of sources, the NCC obtained by the process of the invention has been determined to be unique and superior. A comparative study is summarized in Table 1 below:

TABLE 1

A comparative study comparing a process according to the invention with available processes for making NCC.

| NCC Parameters | Process of the present invention | NCC produced according to existing art |
|---|---|---|
| Hydrolysis conditions utilized in the process | 59-63% $H_2SO_4$, 50 deg, 1-4 h, ratio: 1:10/15 gram pulp/Volume $H_2SO_4$ | 64% $H_2SO_4$, 40 deg, 45 min, ratio: 1:17.5 gram pulp/Volume $H_2SO_4$ |
| Separation of NCC | Separated directly after the reaction | diluted in water before separation |
| Length of NCC (TEM) | 250 ± 100 nm | 100 ± 40 nm |
| Charge | ~0.3-0.9 mmol/g | 0.1-0.3 mmol/g |
| NCC re-dispersible in water | Yes | Yes, more easily dispersed |
| Color of film made of NCC | Transparent | Colorful |
| NCC film properties (XHR-SEM) | Fibers are aligned | Fibers are twisted, showing no alignment |
| Foaming properties | Demonstrating high foaming | Does not form foams |

In some embodiments, the acid concentration is 59, 60, 61, 62 or 63%.

In some embodiments, the acid concentration is 61, 62 or 63%.

In some embodiments, the acid is $H_2SO_4$, and the concentration is 59, 60, 61, 62 or 63%.

In some embodiments, the acid used is $H_2SO_4$, at a concentration of 62 or 63%.

In some embodiments, the ratio between the weight of cellulose containing material, e.g., pulp and the volume of the acid, e.g., sulfuric acid, is between 1 and 40.

In some embodiments, the NCC produced is characterized by nanocrystals having an average length of 250±100 nm.

In some embodiments, the NCC produced by the process is characterized by a charge in the range of ~0.3-0.9 mmol/g.

In some embodiments, the acidification is carried out at any temperature. In some embodiments, the temperature is between 40 and 60° C.

The process of the invention may be carried out on variety of cellulose-containing materials. Such materials may be, for example, any "sludge cellulose source" namely a sludge or waste material from which separation of the cellulose is required or intended. The sludge cellulose source may contain between 5 percent and about 60 percent of cellulose (based on the total amount of solid matter). In some embodiments, the sludge cellulose source is paper mill sludge. Within the context of the present invention, "paper sludge cellulose source", known also as "paper mill waste" or "paper mill sludge", refers to discharges from paper mills containing cellulose left-over that remains after paper and pulp are prepared.

In some embodiments, the sludge cellulose source is a source selected from paper pulp, paper waste water (obtained after the cellulose pulp is filtered through a high mesh filter net) and to any cellulose source recycled from agri- As noted above, in some select embodiments, in a process according to the invention, the following conditions are used: 59-63% $H_2SO_4$, 50° C., 1-4 h, at a ratio of 1:10/15 gram pulp/volume $H_2SO_4$. In some embodiments, the ratio may be 1:40 per 15 grams pulp per volume of acid.

As Table 1 further demonstrates, at 64% acid concentration, NCC could not be isolated. In contradiction to existing technologies, the process of the invention permits formation and separation of NCC materials characterized by fibers having an average length of between 150 and 350 nm. The fibers of the art have been shown to be much shorter.

Thus, in another aspect, the invention contemplates a powder consisting NCC fibers, the fibers having an average length of 250±100 nm.

In another aspect, there is provided a solution consisting NCC fibers and at least one solvent, the NCC fibers having an average length of 250±100 nm. In some embodiments, the solution consists NCC fibers and water. In some embodiments, the solution consists an acid and NCC fibers, the acid may be in the form of an aqueous acid solution or neat. In some embodiments, the solution is a dispersion of NCC fibers in at least one organic medium.

The invention further contemplates use of NCC produced by the process in the production of articles, films and composites thereof, as disclosed herein. In some embodiments, the article is a foam material or a composite.

The invention further provides foam materials, as disclosed herein, the foam materials comprising NCC fibers having average length of 250±100 nm.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 4A is a comparative image of samples cooled at −3° C./min, −5° C./min and at a constant temperature of −50° C. FIGS. 4B-4C are SEM images of the highly-oriented structures for NCC samples cooled at −3° C./min and −5° C./min, respectively.

FIGS. 7A-7D are images showing the sequence of preparation of NCC honeycomb structures of the invention.

DETAILED DESCRIPTION OF EMBODIMENTS

Preparation of NCC 10 grams of 200 μm particle size micro-crystalline cellulose (MCC, Avicel) were suspended in 200 ml of DDW in a glass flask. The flask was positioned in an iced water bath while stirring. $H_2SO_4$ was gradually added to a final concentration of 59% while keeping the temperature at about 50° C. The suspension was transferred to a 60° C. water bath and incubated while shaking for 2-4 hours followed by Centrifugation at 8000 rpm for 10 min. Acid was removed and the pellet was re-suspended in DDW. The washing and re-suspension cycles were repeated for 4 to 5 times until the supernatant coming out of the centrifuge was turbid. Following the final wash the NCC was suspended in around 90 ml DDW (to give around 5% NCC concentration). A sample of the precipitate was weighed before and after drying to determine whiskers concentration.

The same procedure was repeated, mutatis mutandis, with acid concentration of between 60 and 63% to yield NCC of identical quality and purity.

When the acid concentration was 64% and higher or 58% and lower, NCC was not isolated. The materials obtained under these conditions contained cellulose materials of different and varying constitutions. Comparative data is presented in Table 1.

Preparation of NCC Slurries

NCC suspensions were prepared either by acid hydrolysis or by mechanical disruption of cellulose fibers. The cellulose source which was used varied. In all instances, NCC production followed mutatis mutandis the process described below. It should be understood that while the present example specifically described the NCC production from micro-crystalline cellulose, NCC was similarly obtained from other sources such as pulp and paper mill waste.

Hydrolysis:

Hydrolysis was achieved in a preheated 50° C., 60% $H_2SO_4$ solution. Dry pulp was added to this acid solution in 15 L acid/1 kg dry solids ratio. The suspension was mixed with a mechanical stirrer for 2 h. The suspension was then cooled to 15° C. and transferred to Centrifugation at 5,000 g for 5 min. Acid was removed and the pellet was re-suspended in DDW. The washing and re-suspension cycles were repeated for 4 to 5 times until the supernatant coming out of the centrifuge was turbid the retentate reach pH 3.

The same process was repeated at acid concentration between 59 and 63%.

Following the final wash the NCC was suspended in the required amount of DDW to give the final NCC concentration (1%-40%). Neutralization of the NCC was done with 1M NaOH. A sample of the precipitate was weighed before and after drying to determine NCC concentration. 0.1-10% NCC suspensions in water were prepared, followed by sonication by a probe sonicator until the solution became optically clear. The final honey like viscosity of the liquid crystal suspension was achieved after it has been cooled for a few hours.

The Cooling System

Figure 1:
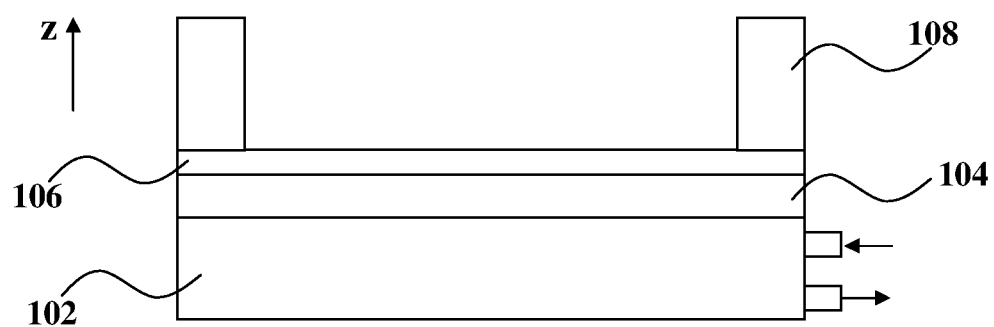
FIG. 1 shows an exemplary schematic representation of a controlled-cooling system used in a process of the invention.

In order to produce foams with vertically aligned pores, a microstructure that combines high compressive and shear strength, a system for controlling the cooling rate of NCC slurries was constructed (FIG. 1). The system included a cooling stage, built from a heat conductive plate (104), e.g., steel, aluminum, copper, and with internal circulation system that enables coolant flow, e.g. liquid/gas nitrogen (102). The coolant (liquid or gas) was flown through the cooling system, thereby controlling the temperature of the plate. The system further included at least one temperature measuring unit, for allowing temperature control of the cooling stage.

The mold used for producing the NCC foams combined a heat-conductive bottom (106) made of a highly thermal-conductive metal, e.g., copper; and insulating walls (108), such as those made from Delrin®, having low thermal conductivity (high temperature resistance).

In other non-limiting examples, the freezing was performed in a standard −80° C. refrigerator. The control of cooling was achieved by assembly of a mould that was thermally insulated, with the mould bottom being made from a conductive material such as copper. Following the pouring of the NCC whipped slurry, the mold was placed in a −80° C. refrigerator. The frozen foam was treated as described above.

Foam Preparation Process

Prior to the casting and freezing, the mold was pre-treated by coating with ice nucleating factors, e.g., a powdery bacterial extract that contained ice nucleating proteins (SNOMAX®), that initiated freezing at around −3° C. The powder was dissolved in water and spread on the cooper bottom of the mold. Subsequently the mold was dried, resulting in coating of the bottom with the nucleating factors. The use of nucleating factors allowed reducing the super-cooling water in the NCC slurries, while maintaining gradual freezing and controlled progression of the ice crystals along the desired temperature gradient.

NCC slurry was cast into the mold, and the mold was transferred to the refrigerator until the slurry stabilized at 4° C. Then, the mold was placed on the precooled cooling stage (0° C.) and the temperature was reduced either at a rate of 1-40° C./min, or by holding the cooling stage at constant temperature of below −30° C.

After freezing was completed, cold ethanol (4° C.) was added and the frozen foam was allowed to thaw overnight. The ethanol was removed and the solvent exchange was repeated twice with new ethanol.

Glycerol and maleic anhydride (1:1.5 mole ratio) were dissolved in ethanol. For 20 g of the glycerol/maleic anhydride mixture 80 mL of ethanol was used. The density of the cross-linked foams was decided by the amount of ethanol used compared to the total weight of the glycerol and maleic anhydride mixture. Castor oil was added to the monomers to introduce more hydrophobicity to the cross-linked foams Usually 20% of castor oil by weight was used compared to the monomer mixture, e.g., 4 g Castor oil for 20 g of the glycerol maleic anhydride mixture.

The solution containing the monomers was used to either soak dry NCC foams or NCC foams containing a solvent, e.g., ethanol. If the NCC foam contained a solvent, the soaking was performed during gentle agitation for 8-24 hours followed by drainage of the remaining monomer solution. The foam was then cured at lower temperatures first at about 100° C. for 6-12 hours, followed by curing at higher temperatures 130-160° C. for 1-4 hours.

Optimization of Freezing Conditions for Production of Unidirectional Foams

In order to explore the optimal freezing conditions, different freezing rates and temperatures were attempted, mainly freezing at constant temperature and in decreasing temperature.

Figure 2:
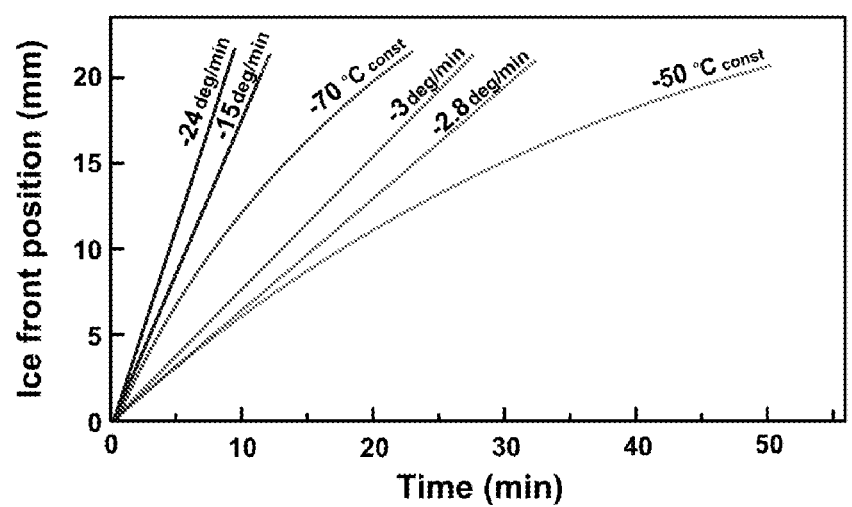
FIG. 2 shows the kinetics of ice front during unidirectional freezing of 3% NCC slurries under various cooling regimes.
Figure 3:
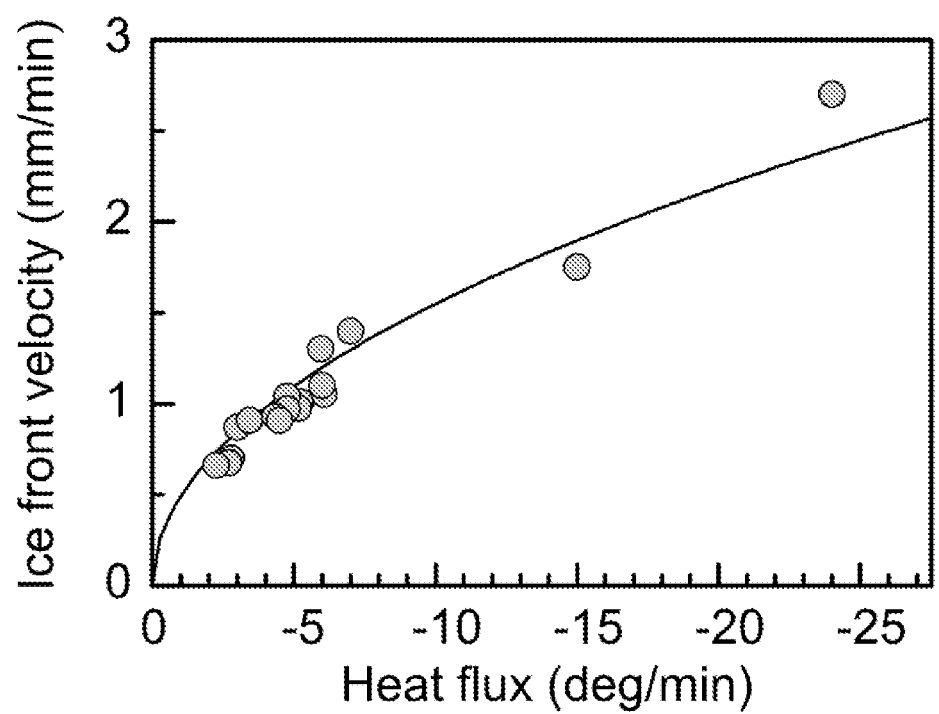
FIG. 3 shows the dependence of ice-front velocity on the heat flux for 3% NCC slurries.

The effect of cooling rate on ice front velocity was evaluated by video imaging of the ice front progression during freezing process. In order to visualize and record the ice front progression, transparent mold frame was used. Freezing was carried out in different cooling rates: between −0.5 and −40° C./min. Freezing was also carried out on a stage with a constant temperature of between −50 and −70° C. at the heat-conductive bottom (106, FIG. 1). See comparative results in FIGS. 2-3.

After freezing, the samples were freeze-dried and analyzed by electron microscopy (SEM). It can be concluded that most aligned pore structure for 3% NCC slurry was obtained at cooling rates of between 3 and 5° C./min (FIG. 4). At higher cooling rates (e.g., 10-40° C./min) more interconnections in the pore structure appeared.

Figure 5:
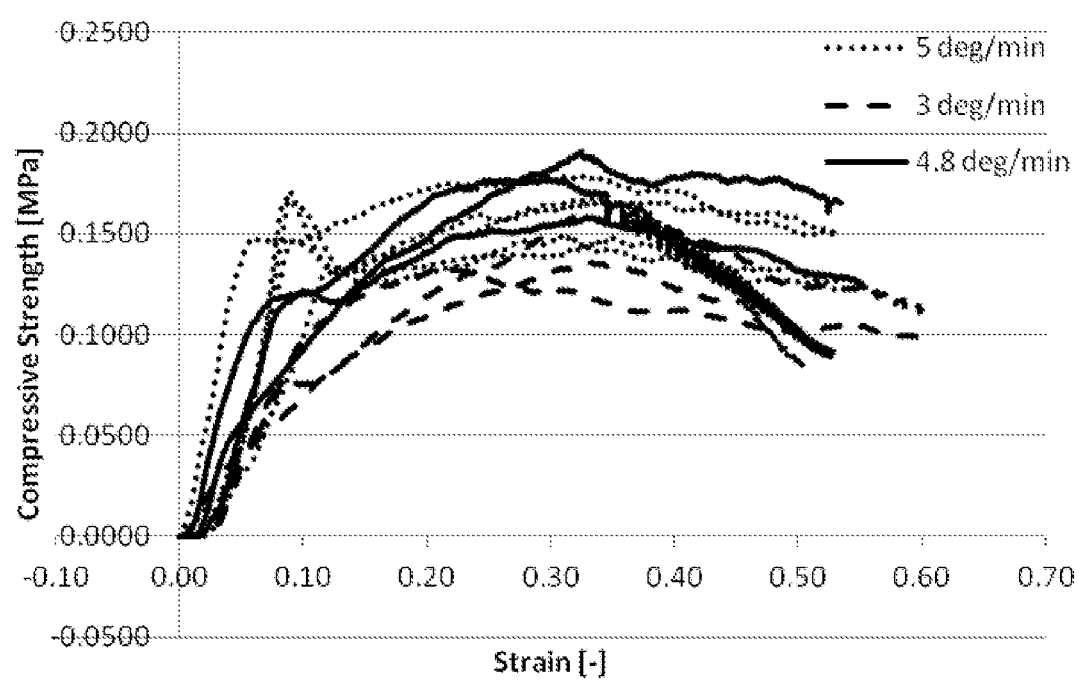
FIG. 5 presents compression strength-strain curves of samples cooled at −3° C./min, −4.8° C./min and −5° C./min.
Figure 6:
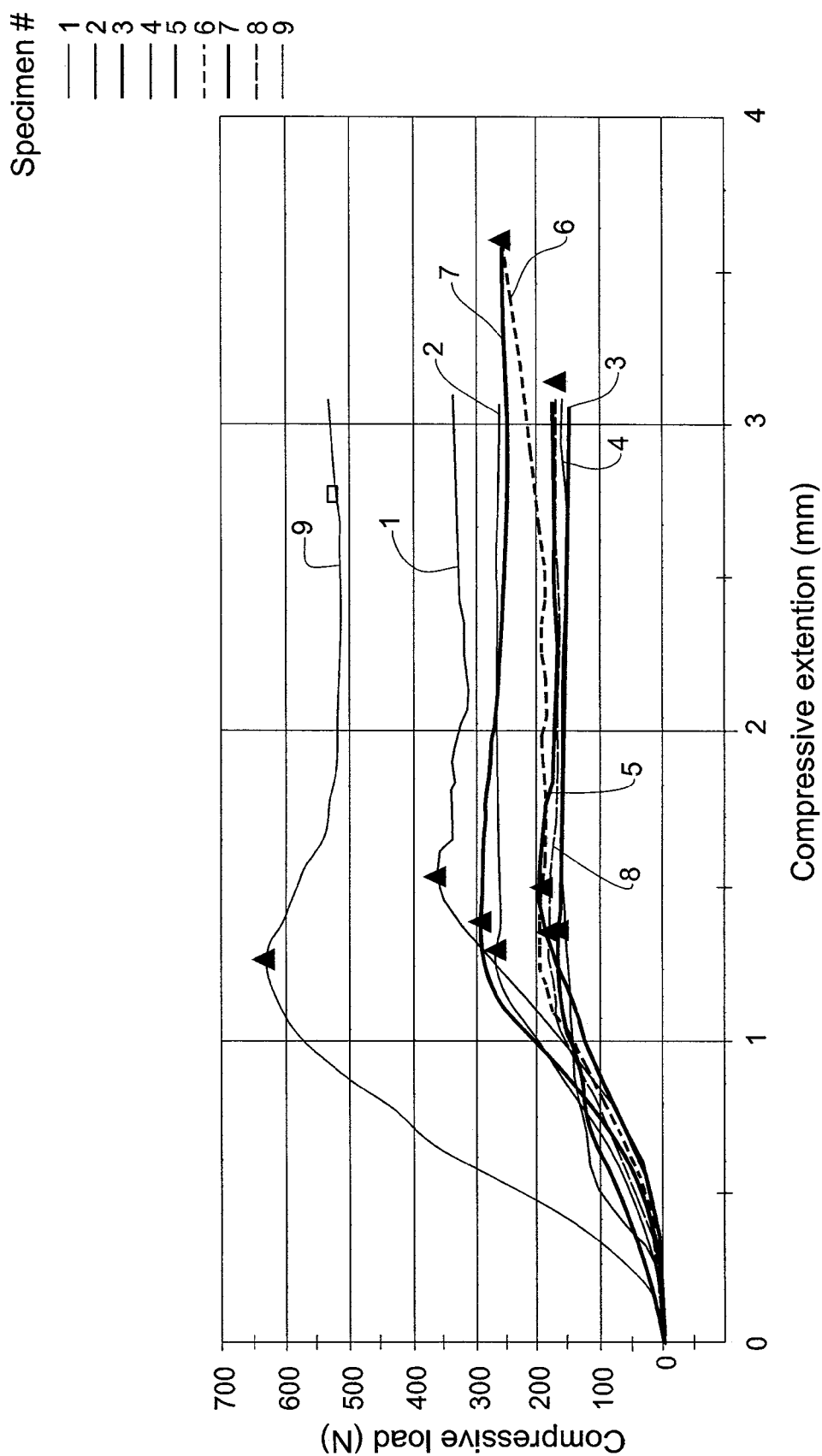
FIG. 6 provides a graphical presentation of compression strengths of foam boards according to the invention.

In order to measure the effect of morphology, samples were tested for compression strength using tensile tester. It was concluded that cooling rates of 3-5° C./min yielded more aligned structures in the Z direction, and therefore higher compression strength in the this direction (FIG. 5). The foams were analyzed by compression tests using Instron tensile tester set to compression mode at rate of 1.3 mm/min. Force (N) and displacement (mm) curves were recorded during the compression. Stress/strain curves were generated by dividing the force with the samples' surface area and by dividing the displacement with the samples' height (FIG. 6). Foams were cast into a 2 cm diameter cell molds and measured for compression strength using Instron machine Model 3345; Load cell 5,000N. Measurements were carried out at a rate of 2.5 mm/min.

Production of 30×20×2 cm Unidirectional Foam Panels 1,500 ml NCC slurry at 3% was poured into the copper Delrin® mold and transferred to the refrigerator until the temperature was stabilized at 4° C. The pre-cooled mold was then placed on the cooling stage with liquid nitrogen flow that reduced temperature at rate of 3° C./min until it reached −150° C. After freezing was completed, cold ethanol was poured on top of the frozen slurry and left for thawing. After thawing, fluids were removed and another two ethanol washes were carried out. Compression strength of a foam board according to the invention is given in FIG. 6. As may be noted, compression strengths can vary between about 2 and 0.4 MPa due to changes in density. Foams of 100 kg/m$^3$ obtain compression strength of around 0.4 MPa while foams of 200 kg/m$^3$ obtain compression strength of around 2 MPa.

Honeycomb Foams

The methods above allow production of bulk foams but also of foams with complex internal architecture such as honeycomb structure. This is enabled by preparing a second mold that is dipped into the NCC slurry before freezing (FIG. 7). The mold renders the foam with a honeycomb shape and is removed during the drying of the foam. Due to the directional freezing the compression strength of the foam is increased compared to non-directional foams. It was observed that freezing rates that result in ice front progression of above 5 mm/min, the foams shrink along the Z axis; nevertheless it was found that this allows the formation of film-like walls around the honeycomb cells, resulting in significantly increased compressive strengths.

SPECIFIC EXAMPLES

Example 1

A 1.0 L suspension comprising 2-5% NCC was mixed with a 2% xyloglucan solution. A 1:1 mixture of water and a commercial detergent was prepared and added to the mixture while stirring. After the addition of 2 mL of a detergent, stirring was maintained until the volume reached 1.3 L. A solution of nucleating factors (1 pellet of Snomax snow inducer dissolved in 50 ml DDW) was added on the top of a 360×260 mm copper plate having plastic walls (12×12 mm). The nucleating factor solution was evenly spread and dried on the plate. The foamed NCC suspension was added to the copper plate surface and the foam surface was made even by spackling. A freezing stage was pre-cooled to −80° C. and the mold containing NCC foam was applied on top.

After freezing, cold ethanol was added to the frozen NCC foam. After thawing, more ethanol was added to the foam to remove the remaining water during agitation. The foam was now ready for crosslinking. 100 g glycerol (1.086 mol), 160 g maleic anhydride (1.629 mol) and 50 g castor oil (0.056 mol) were dissolved in 0.5-1 L ethanol was added to the foam. The amount of ethanol determined the final density of the foam. The monomer solution was removed and the soaked foam was cured at 110° C. over-night. Additional curing at 150° C. for 1-2 hour gave hard yellow foams.

To improve the mechanical strength and fire retardation properties, the foams were soaked with a solution of furfuryl alcohol, furan resin, boric acid and triphenyl phosphate in acetone or ethanol. The soaked foams were cured at 130-150° C. until strong black foams were obtained.

Example 2

An ice cream machine was used for the following experiments together with NCC and different additives.

The NCC was mixed with either ethanol or glycerol before mixing in the ice cream machine in order to obtain a sorbet or slush like texture of the NCC. In one experiment a 5% NCC suspension was mixed with ethanol to obtain a 5% ethanol concentration. After pre freezing the NCC was poured to a mold for the final freezing at a lower temperature.

In another experiment glycerol was also tried together with the NCC in the ice cream machine. A similar sorbet like texture was obtained when 10% glycerol was used. In a third experiment a premade sorbet of 5% ethanol was added to ice cold NCC. The mixture was then completely frozen at lower temperatures.

Example 3

Another approach was to use solvents with high freezing point e.g. glacial acetic acid and DMSO to create pours within the NCC. Acetic acid or DMSO were first frozen and then mixed with different amounts off ice cold NCC. The NCC containing the frozen solvents were either directly put in ethanol for precipitation of the NCC and leaching of the frozen solvents. Alternatively the NCC with acetic acid or DMSO crystals was frozen completely before solvent exchange and drying.

Example 4

Emulsion of NCC with castor oil was also prepared to investigate the possibility of creating closed cell structures within the NCC due to micelle formation. Detergents were used to stabilize the emulsions. The reason for using castor oil was the high solubility of the oil in ethanol. The emulsions were either frozen directly or put in ethanol.

Example 5

During the experiments it was found out that when NCC was vigorously mixed with a detergent it was concentrated to the bubbles walls acting as a fibrous surfactant and stabilizes the foam. As a result, thick foam was formed similar to whipped cream or eggs.

Different detergents were tested. In the initial experiments NCC/detergent mixtures were vigorously whipped in a homogenizer (UIltra Turrax) until homogenous foams were obtained. The foaming was controlled by the amount of detergent and the speed of the mixing. After the initial experiments, a NCC concentration was adjusted to 5% endowing the same foam density as with the aligned NCC foams taking in consideration the increase of volume. The mixing was set to low speed to ensure homogenous foaming For 1 L NCC with a concentration of 5% 2 mL of a detergent-water (1:1) mixture was used. By reaching the volume of 1.3 L the foams were ready for freezing.

After the whipping was completed the samples were frozen on the same freezing stage previously used for freezing the aligned foams. During the freezing experiments it was noticed that whipped foams were resistant to low temperatures without any shrinkage that was observed in previously manufactured foams Moreover it was found that the foam structure was far less susceptible to differences in the freezing conditions therefore it was no longer necessary to freeze in a temperature gradient and the foams could be produced at a constant temperature, e.g., $-80°$ C. This resulted in relatively fast freezing (15-20 minutes for completion) and also the possibility to freeze several foams in a row. The stage could be kept at constant temperature omitting the time consuming requirement for reheating the freezing to $0°$ C. before each freezing cycle.

Attempts were also performed to freeze the foams in air freezing (refrigerator). Compared to the freezing according to processes of the invention, air freezing allowed the progression of several ice fronts from different directions and should enhance the freezing rate. Since freezing from the bottom was maintained the foams still keep some degree of Z direction orientation combined with the spherical isotropic structure that renders the foams significantly improved homogeneity, bending and shear strength.

Characterization of Foam Structures and Other Products According to the Invention Foam samples were cut and analyzed by scanning electron microscopy (SEM). The SEM analysis showed a clear structure of the foams. When NCC was either dried or frozen in a directional freezing it self-assembles into laminated structures, as defined herein. Interestingly this structure was maintained in products according to the invention.

When foams were made utilizing a detergent as described, the sheets were formed around of the soap bubbles resulting in a spherical structure. The structure was formed during the whipping where the liquid solution of water, NCC, xyloglucan and a detergent concentrated at the bubbles walls. During the freezing the bubbled structure was maintained and dictated the final foam into spherical structure. SEM images were analyzed by "ImageJ" image processing software [Rasband, W. S., ImageJ, U.S. National Institutes of Health, Bethesda, Md., USA, http://rsb.info.nih.gov/ij/, 1997-2014]. The average pore size was determined at 100 µm±32 µm. The single sheet thickness was 5 µm, similar to the laminated directional foams. Moreover the spheres exhibited open cells structure and were relatively homogenous throughout the foam. The spherical structure of the foams improved their resistance to shrinkage and bending.

The initial step in preparation for testing of the foams density was removal of the foams edges. The foams were cut with a scroll saw to dimensions of 20×30×1 cm, weighed and the density was recorded. Using a blackboard chalk the foam was divided and cut with the saw to 5×5 cm. Each sample was weighed for density calculation followed by compression testing.

Once the first two foams ready they were cut for compression testing as described above. Statistical analysis of all the foams was performed by Analysis of Variance (ANOVA) procedure using JMP 11 software (JMP 11 Statistical Discovery™).

As shown in Table 2 below, foams nos. 1 and 2 complied with the density requirements but their compressive strength was slightly below 1 MPa. This result required further improvement in the production method mainly in the final step of the crosslinking Adjustments of the final crosslinking formulation of furfuryl alcohol and flame retardants allowed significant improvements in the foams strength. As shown below the improvements were performed in several steps until the most satisfactory formulation was achieved. Following the first improvement a set of 3 new foams was prepared for testing (foam nos. 3-5). The testing results indicated that the foams were improved and all the last three foams met the technical parameters.

Additional foams were prepared in order to try and reach higher compressive strength results. The improvement was performed mainly by modifying the crosslinking reaction, optimization of the ratios between the components and crosslinking time and temperatures. A set of two foams were prepared which felt by hand impression significantly stronger compared to the previous foams. The tests indicated that indeed they were significantly stronger but also slightly heavier since the density was raised above 200 Kg/m$^3$ (foam nos. 7 and 8). Consequently the crosslinking was tuned once more to generate a set of four new foams with improved strengths compared to foams 1-5, as well a density that meets the requirements. Moreover, the foams were relatively homogenous in their density and compressive strength (foam nos. 8-11).

TABLE 2 summary of foam compression studies

| Foam No. | No. of 5 × 5 cm samples tested | Density (Kg/m³) ± Standard Error | Confidence interval 95% | | Compressive strength (MPa) | Confidence interval 95% | |
|---|---|---|---|---|---|---|---|
| | | | Upper (Kg/m³) | Lower (Kg/m³) | | Upper (MPa) | Lower (MPa) |
| 1 | 21 | 172.0 ± 2.1 | 176.1 | 167.8 | 0.73 ± 0.04 | 0.80 | 0.66 |
| 2 | 22 | 190.0 ± 2.4 | 194.9 | 185.2 | 0.88 ± 0.03 | 0.94 | 0.81 |
| 3 | 21 | 193.0 ± 2.4 | 197.6 | 188.1 | 1.00 ± 0.03 | 1.06 | 0.94 |
| 4 | 18 | 187.0 ± 2.7 | 192.4 | 181.6 | 1.12 ± 0.04 | 1.19 | 1.05 |
| 5 | 22 | 190.6 ± 2.4 | 195.5 | 185.8 | 1.14 ± 0.03 | 1.20 | 1.08 |
| 6 | 24 | 197.7 ± 3.1 | 203.9 | 191.5 | 1.84 ± 0.04 | 1.93 | 1.76 |
| 7 | 24 | 204.8 ± 3.1 | 210.9 | 198.6 | 1.86 ± 0.04 | 1.95 | 1.77 |
| 8 | 21 | 190.0 ± 1.4 | 193.2 | 187.8 | 1.58 ± 0.03 | 1.64 | 1.52 |
| 9 | 15 | 197.2 ± 1.6 | 200.0 | 194.0 | 1.60 ± 0.04 | 1.68 | 1.53 |
| 10 | 20 | 197.3 ± 1.4 | 200.0 | 194.5 | 1.68 ± 0.03 | 1.74 | 1.61 |
| 11 | 17 | 192.8 ± 1.5 | 195.8 | 189.7 | 1.68 ± 0.03 | 1.74 | 1.60 |

Foam fire retardation properties were evaluated in comparison to commercial expanded rigid PVC foam. During the development of the fire retardation formulations qualitative evaluation of the foam samples was performed under aggressive fire condition applying Bunsen burner flame for 60 seconds. During the test it was observed that the expanded PVC foam produced relatively large flame and generated large amounts of black smoke. Examination of the samples following the burning revealed that the foam deformed and lost significant mass. Moreover the fire progressed and consumed large part of the foam. On the other hand, when the NCC foam was exposed to the fire, a significantly less powerful flame was observed along with a significantly reduced smoke generation. Moreover the flame damage was local and mild structural deformation was observed.

Quantitative testing was performed according to EN ISO 11925-2:2010 standard "ignitability test of building products subjected to direct impingement of flame". Foams were cut to 8×30×1 cm stripes which were tested according to the standard. The test included applying a small flame on the sample for 30 seconds. All samples that were tested did not burn at all. No droplets were observed and thermal camera observation indicated that the foams were cooling very rapidly and could be touched after 1 minute from removal of the flame. The test was extended to 120 seconds with similar results.

In addition to the fire test before, the foam samples were burned nondestructive thermal characterization was performed. The average thermal resistance of the foams was 0.044 W/mK similar to insulation materials such as mineral wool at density of 180 kg/m³ (0.043 W/mK).

Table 3 provides a summary of the ISO 11925-2:2010 flame test results.

More tests were performed comparing NCC foam to commercial expanded PVC foam. During the test different parameters were measured in order to determine the samples properties. Applying the flame on the expanded PVC foam resulted in immediate formation of extensive orange flame and extensive black smoke. The expanded PVC foam failed in the criteria of the "time of start of test of flame tip to reach 150 mm" which occurred in few seconds.

TABLE 3 summary of the ISO 11925-2: 2010 flame test results

| Foam material | Specimen No. | Ignition Yes/No | Time from start of test of flame tip to reach 150 mm (seconds) | Extent of flame spread (mm) | Flaming debris | Glowing | Extent of damaged area (mm) | |
|---|---|---|---|---|---|---|---|---|
| | | | | | | | Height | Width |
| expanded PVC | 1 | No | Immediate | Extensive | None | None | 191.5 | 34.9 |
| | 2 | No | Immediate | Extensive | None | None | 192 | 37.9 |
| | 3 | No | Immediate | Extensive | None | None | 175.5 | 51.1 |
| | 4 | No | Immediate | Extensive | None | None | 176.9 | 45 |
| | 5 | No | Immediate | Extensive | None | None | 171.8 | 45.9 |
| | 6 | No | Immediate | Extensive | None | None | 160.1 | 28 |
| | | | Average | | | | 178 | 40.5 |
| NCC foam | 1 | No | Did not reach | Minor | None | None | 93.2 | 30.8 |
| | 2 | No | Did not reach | Minor | None | None | 81.7 | 20.6 |
| | 3 | No | Did not reach | Minor | None | None | 88.5 | 24.6 |
| | 4 | No | Did not reach | Minor | None | None | 111.4 | 31.7 |
| | 5 | No | Did not reach | Minor | None | None | 110 | 26 |
| | | | Average | | | | 97 | 26.7 |

The performance of the NCC foam was significantly superior. The flame was limited, little smoke was produced and the flame tip was maintained significantly below 150 mm during the whole test.

Following the removal of the flame, the foam was inspected and the surface area of the damage was measured.

The damage surface area of the expanded PVC foam was significantly higher compared to the NCC-foam. In fact the damage area of the NCC foam was limited to the surface while the foam maintained its structural integrity compared to the expanded PVC foam were significant structural damage and deformation was observed.

The invention claimed is:

1. A process for producing nanocrystalline cellulose (NCC) from a cellulose-containing sludge, the process comprising:
    contacting the cellulose-containing sludge with acid,
    wherein the cellulose-containing sludge is treated with an aqueous sulfuric acid solution comprising 61 to 63% sulfuric acid to form treated cellulose-containing material, said treatment does not alter the morphology of the cellulose present in the cellulose-containing material;
    maintaining the treated cellulose-containing material at a temperature of about 50° C. thereby causing preferential degradation of cellulose amorphous domains while maintaining intact the cellulose crystalline domains; and
    isolating crystalline NCC;
    wherein the only acid that contacts the cellulose-containing sludge consists of sulfuric acid.

2. The process according to claim 1, wherein the cellulose-containing sludge comprises at least one member selected from the group consisting of paper mill sludge, paper pulp, paper waste water, cellulose source recycled from agricultural or industrial by-products, municipal sludge, municipal sewage, dairy farms sludge, and agricultural cellulosic waste.

3. The process according to claim 1, wherein the cellulose-containing sludge is treated with the aqueous sulfuric acid solution comprising 62 to 63% sulfuric acid.

4. The process according to claim 1, wherein the NCC produced is characterized by nanocrystals having an average length of 250±100 nm.

5. The process according to claim 1, wherein the NCC produced is characterized by a charge in the range of ~0.3-0.9 mmol/g.

6. The process according to claim 1, wherein the cellulose-containing sludge is selected from at least one member of the group consisting of paper mill sludge discharged from a paper mill, toilet paper scraps, vegetable fibers, wheat straw, sunflower stalks, garment industry scraps.

7. The process according to claim 1, wherein the cellulose-containing sludge comprises paper mill sludge discharged from a paper mill.

8. The process according to claim 1, wherein the cellulose-containing sludge comprises at least one member selected from the group consisting of paper pulp and paper waste water.

9. The process according to claim 1, wherein the cellulose-containing sludge comprises at least one member selected from the group consisting of cellulose source recycled from agricultural or industrial by-products, municipal sludge, municipal sewage, dairy farms sludge, and agricultural cellulosic waste.

10. The process according to claim 1, wherein the treated cellulose-containing sludge is maintained with the aqueous sulfuric acid solution comprising 61 to 63% sulfuric acid for 1 to 4 hours.

11. The process according to claim 10, wherein the isolated crystalline NCC are fibers having an average length of between 150 and 350 nm.

12. The process according to claim 11, wherein the treated cellulose-containing sludge is maintained with the aqueous sulfuric acid solution comprising 62 to 63% sulfuric acid for 1 to 4 hours.

13. The process according to claim 1, wherein the cellulose-containing sludge contains between 5 percent and 60 percent of cellulose based on total amount of solid matter.

14. The process according to claim 13, wherein the cellulose-containing sludge comprises at least one member selected from the group consisting of cellulose source recycled from paper mill waste discharge from paper mills or paper mill sludge discharge from paper mills.

15. The process according to claim 14, wherein the treated cellulose-containing sludge the sludge is not contacted with acid other than sulfuric acid.

16. The process according to claim 15, wherein the cellulose-containing sludge is not pretreated prior to contact with sulfuric acid.

17. The process according to claim 1, wherein the cellulose-containing sludge is not pretreated prior to contact with sulfuric acid.

* * * * *